United States Patent
Gibson et al.

[11] 3,836,911
[45] Sept. 17, 1974

[54] CODING ARRANGEMENT FOR FIBER OPTIC DIGITAL DISPLAY DEVICE

[75] Inventors: Richard D. Gibson, Wilbraham; Robert D. Whelan, West Springfield, both of Mass.

[73] Assignee: General Instrument Corporation, Newark, N.J.

[22] Filed: July 16, 1973

[21] Appl. No.: 379,212

[52] U.S. Cl. ............ 340/380, 40/130 E, 116/124.4, 340/189, 340/202, 340/336, 360/96 R
[51] Int. Cl. ............................................. G08b 5/36
[58] Field of Search ........... 340/336, 380, 189, 202; 350/96 R; 116/124.4; 40/130 E

[56] References Cited
UNITED STATES PATENTS
3,163,949  1/1965  Gley.................................. 350/96 R
3,467,960  9/1969  Hosker.............................. 340/380

*Primary Examiner*—David L. Trafton

[57] ABSTRACT

A display device utilizes a fiber optic bundle having a light input end and a light output end. The light input end is divided into a plurality of distinct groups of one or more fibers, the groups being arranged generally radially in a relatively narrow sector of a circle. The fibers at the light output end are arranged in an indicia producing matrix. Means are provided for illuminating the light input end of the bundle and masking means are interposed between the input end and the illuminating means. The masking means has a plurality of masks thereon, each of which is operative in a circle sector substantially the same shape as the input group sector. The mask means are movable to bring a selected one of the masks into position to block or expose certain groups of fibers in such a way as to form representations of different indicia at the output end.

The first embodiment has a fiber coding arrangement composed of ten groups of fibers arranged vertically at the input end and in a figure 8 matrix at the output end. In the second embodiment the arrangement has twenty groups of fibers arranged in two even vertical columns at the input end and arranged in a matrix consisting of three rows intersecting three columns at the output end.

13 Claims, 24 Drawing Figures

$a\ e_1\ e_2\ e_3\ i_3$
$c_2\quad\quad\quad d_2$
$c_1\quad\quad\quad d_1$
$b\ f_1\ f_2\ f_3\ i_2$
$g_3\quad\quad\quad h_3$
$g_2\quad\quad\quad h_2$
$g_1\quad\quad\quad h_1$
$j_1\ j_2\ j_3\ j_4\ i_1$

FIG. 3

```
oooo — j
ooo  — i
ooo  — h
ooo  — g
ooo  — f
ooo  — e
oo   — d
oo   — c
o    — b
o    — a
```

$a\ e_1\ e_2\ e_3\ i_3$
$\quad\quad\quad\quad d_2$
$\quad\quad\quad\quad d_1$
$b\ f_1\ f_2\ f_3\ i_2$
$g_3$
$g_2$
$g_1$
$j_1\ j_2\ j_3\ j_4\ i_1$

FIG. 5

$a\ e_1\ e_2\ e_3\ i_3$
$\quad\quad\quad\quad d_2$
$\quad\quad\quad\quad d_1$
$f_1\ f_2\ f_3\ i_2$
$\quad\quad\quad\quad h_3$
$\quad\quad\quad\quad h_2$
$\quad\quad\quad\quad h_1$
$j_1\ j_2\ j_3\ j_4\ i_1$

FIG. 6

$a\quad\quad\quad\quad i_3$
$c_2\quad\quad\quad d_2$
$c_1\quad\quad\quad d_1$
$b\ f_1\ f_2\ f_3\ i_2$
$\quad\quad\quad\quad h_3$
$\quad\quad\quad\quad h_2$
$\quad\quad\quad\quad h_1$
$\quad\quad\quad\quad i_1$

FIG. 7

$a\ e_1\ e_2\ e_3\ i_3$
$c_2$
$c_1$
$b\ f_1\ f_2\ f_3\ i_2$
$\quad\quad\quad\quad h_3$
$\quad\quad\quad\quad h_2$
$\quad\quad\quad\quad h_1$
$j_1\ j_2\ j_3\ j_4\ i_1$

FIG. 8

$a\ e_1\ e_2\ e_3\ i_3$
$c_2$
$c_1$
$b\ f_1\ f_2\ f_3\ i_2$
$g_3\quad\quad\quad h_3$
$g_2\quad\quad\quad h_2$
$g_1\quad\quad\quad h_1$
$j_1\ j_2\ j_3\ j_4\ i_1$

FIG. 9

$a\ e_1\ e_2\ e_3\ i_3$
$\quad\quad\quad\quad d_2$
$\quad\quad\quad\quad d_1$
$\quad\quad\quad\quad i_2$
$\quad\quad\quad\quad h_3$
$\quad\quad\quad\quad h_2$
$\quad\quad\quad\quad h_1$
$\quad\quad\quad\quad i_1$

FIG. 10

$a\ e_1\ e_2\ e_3\ i_3$
$c_2\quad\quad\quad d_2$
$c_1\quad\quad\quad d_1$
$b\ f_1\ f_2\ f_3\ i_2$
$\quad\quad\quad\quad h_3$
$\quad\quad\quad\quad h_2$
$\quad\quad\quad\quad h_1$
$j_1\ j_2\ j_3\ j_4\ i_1$

FIG. 11

$a\ e_1\ e_2\ e_3\ i_3$
$c_2\quad\quad\quad d_2$
$c_1\quad\quad\quad d_1$
$b\quad\quad\quad\quad i_2$
$g_3\quad\quad\quad h_3$
$g_2\quad\quad\quad h_2$
$g_1\quad\quad\quad h_1$
$j_1\ j_2\ j_3\ j_4\ i_1$

```
ooo — t      ooo — j
oo  — s      oo  — i
oo  — r      oo  — h
oo  — q      oo  — g
o   — p      o   — f
o   — o      o   — e
o   — n      o   — d
o   — m      o   — c
o   — l      o   — b
o   — k      o   — a
```

CODING ARRANGEMENT FOR FIBER OPTIC DIGITAL DISPLAY DEVICE

This invention relates to display devices and in particular to a fiber optic display device having a novel coding arrangement, primarily designed for use in television receivers.

For as long as television receivers have been produced, manufacturers have been looking for new and better ways to display the number corresponding to the channel which the user of the television set has selected. Conventional methods of displaying the channel number have taken various forms including digital geneva wheels, straight wheels, continuous film strips, geneva digital dials and standard knob arrangements. Each of these conventional display methods suffers, to a greater or lesser degree, from one or more disadvantages and therefore none have been found completely satisfactory.

Included in this list of disadvantages are: poor number registration between the units and the tens digits displayed; poor number registration of the digits with respect to the display window; scratching of the film on the film strip; uneven illumination of the numerals displayed; direct viewing requiring the storage size to be equal to the display size; relative rigidity of the display location with respect to the control knobs; nonadaptability to preset UHF channel selection; too great a volume required for the display device and, in particular, the difficulty of producing a sturdy and reliable display device at a competitive cost.

The problems inherent in the use of these conventional display methods in conjunction with a television receiver which is capable of receiving only the twelve VHF channels are, of course, significantly increased when these methods are used in a television receiver adapted to receive not only the twelve channels in the VHF band but also the seventy channels in the UHF band. Normally, two separate display devices, one for the VHF channels and one for the UHF channels, are utilized. Naturally, the problems of size and cost associated with a single display device are doubled when two display devices are necessary. Further, a problem relating to the suitable integration of the two separate display devices in a single tuner is developed in TV receivers having dual band reception capability.

Since the invention of light transmitting fibers, these fibers have been utilized in various applications, one of which has been different types of display devices. Because of certain inherent advantages of a fiber optic display device, the suitability of this type of device for use in a television receiver was recognized. However, because of cost limitations and various other factors, fiber optic display devices have not as yet been utilized extensively in television receivers on a commercial scale.

Normally, in fiber optic display devices the fibers are situated in a specific order (referred to as a coding arrangement) within the fiber optic bundle to create a desired visual effect. One end of the bundle, which might be termed the input end, is illuminated in an appropriate fashion. The other end of the bundle, which might be termed the output end, is placed in a position wherein it can be observed. By masking the input end of certain of the fibers at selected times, the desired patterns, in this case numerals, can be displayed at the output end of the bundle. The quality of the display pattern as well as the versatility of the device is dependent upon the coding arrangement of the fibers in the fiber optic bundle. For TV applications, two fiber optic bundles can be utilized in a side-by-side relationship to create a two-digit number, if the appropriate masking methods are used.

The coding arrangement must be capable of displaying numerals which are of appropriate size to be comfortably observed at normal viewing distances from the television. Further, the displayed numerals should be formed in an aesthetically pleasing array.

Since tuner manufacturers are forced by market conditions to produce tuners which take up a relatively small volume of the TV set and which are reliably built for a minimum cost, the coding arrangement must be such as to employ the minimum number of fibers and still create an aesthetically pleasing display of adequate size which may be inexpensively produced. Further, if a fiber optic display is only used to represent the UHF band, the device must be easily integratable with the conventional display device used to display the channels of the VHF band.

The coding arrangement must also be capable of eliminating the problems of uneven illumination which often plague fiber optic display devices. Because of the directiveness of light coming from the output end of the fiber bundle, certain parts of the display pattern (called "hot spots") are illuminated to a greater extent than the rest of the pattern. Prior art techniques have tried to eliminate this problem by dispersing the light as it comes from the output end of the bundle. However, this solution has proved inadequate because it substantially reduces the level of illumination and therefore the intelligibility of the display numeral. The solution to this problem becomes increasingly difficult when working with a limited number of fibers, a situation which is dictated by cost limitations placed on the tuner manufacturer because of the competitiveness of the television market.

It is therefore the prime object of the present invention to produce a fiber optic display device having a coding arrangement wherein the display pattern is evenly illuminated throughout and which displays numerals which may be slanted due to the flexibility of the fibers, and rounded and centered, if desired, thereby creating an aesthetically pleasing display.

It is another object of the present invention to provide a fiber optic display device having a coding arrangement wherein the proper registration between the units and the tens digit and between the digits and the display window is achieved.

It is a further object of the present invention to provide a fiber optic display device taking up minimum volume and having a coding arrangement which produces an apparent magnification of the display pattern to display numerals of adequate size so that they can be viewed comfortably at the desired distance.

It is a further object of the present invention to provide a display device wherein the display location is not rigidly preset with respect to the location of the control knobs.

It is still another object of the present invention to provide a display device which is adaptable for use in a tuner receiving all of the UHF channels as well as for use in a tuner utilizing preset UHF channel selection.

In accordance with the present invention the display device utilizes a plurality of light transmitting fibers in the form of a bundle which has a light input end and a light output end. The light input end is divided into a plurality of distinct groups of one or more fibers. The groups are arranged generally radially in a relatively narrow sector of a circle. The fibers at the light output end are arranged in an indicia producing matrix. A source of illumination is provided to illuminate the light input end of the fiber bundle.

Interposed between the light input end and the illuminating means is a masking means having a plurality of individual masks thereon. Each of the masks is operative on a circle sector substantially the same shape as the input group sector. The masking means is movable to bring a selected one of the masks into position to block or expose certain groups of fibers in such a way as to form representations of different indicia at the output end.

Two embodiments of the coding arrangement are disclosed. In the first embodiment, ten groups of fibers are provided arranged vertically at the input end and arranged in a figure 8 matrix at the output end. In the second embodiment there are twenty groups of fibers, the groups being arranged in two even vertical columns at the input end and in a matrix consisting of three rows intersecting three columns at the output end.

The coding arrangements produce an aesthetically pleasing display pattern wherein the digits are in proper registration with each other and with the periphery of the display window. A minimum number of fibers is utilized in the coding arrangements to keep the cost competitive with conventional systems. Further, these coding arrangements produce even illumination throughout the display pattern, thereby eliminating "hot spots." The numerals displayed are of adequate size for comfortable viewing and the display location is not rigidly determined with respect to the location of the control knobs. Further, the display device is adaptable to be used with a TV tuner which may receive all of the UHF channels or just a preset number thereof, as desired.

To the accomplishment of the above, and to such other aspects as may hereinafter appear, the present invention relates to a fiber optical display device having a novel coding arrangement as defined in the appended claims and as described in the specification, taken together with the accompanying drawings, wherein like numerals refer to like parts and in which:

FIG. 2 is a schematic representation of the first preferred form of the coding arrangement showing the input end of the fiber bundle;

FIGS. 3-12 are schematic representations of the first preferred form of the coding arrangement showing the various display patterns which can be produced by this coding arrangement;

FIG. 13 is a schematic representation of the second preferred form of the coding arrangement showing the input end arrangement of the fiber bundle; and FIGS. 14-24 are schematic representations of the second preferred form of the coding arrangement showing the various display patterns which can be produced by this coding arrangement.

Figure 1:
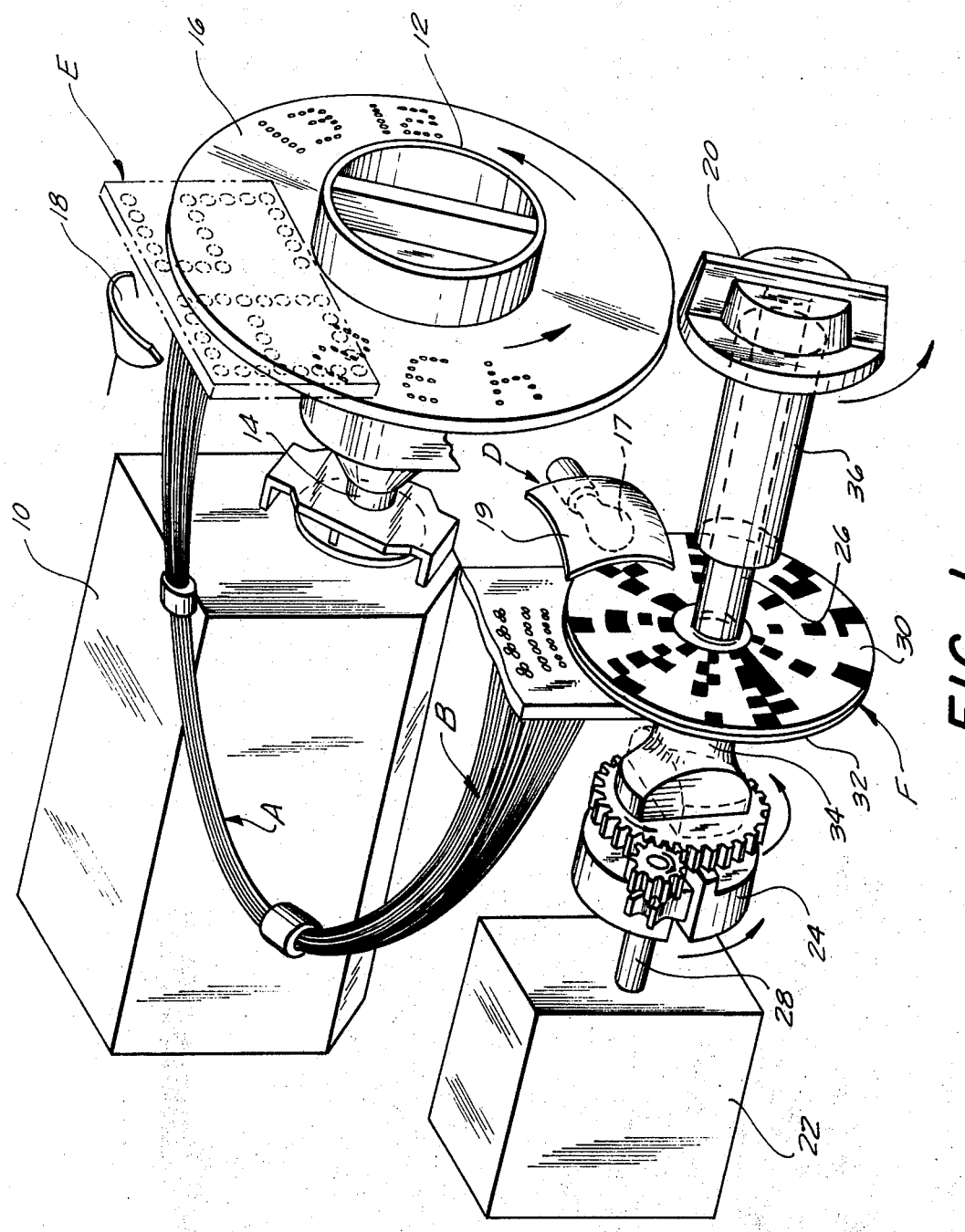
FIG. 1 is an isometric view of a preferred form of the display device which could be utilized in a TV tuner receiving both VHF and UHF stations.

The display device of the present invention comprises a fiber optic bundle, generally designated A, having an input end, generally designated B, and an output end, generally designated C. A source of illumination, generally designated D, is placed in close proximity to the input end B of fiber bundle A. Illumination source D will illuminate the input end B of fiber bundler A which will transmit the light along its length to output end C. The light from output end C is then transferred onto a viewing screen, generally designated E, which is immediately adjacent output end C, and in a position to be observed by a viewer.

A rotatable masking means, generally designated F, is interposed between the source of illumination D and the input end B of the fiber optic bundle A. Masking means F, as will be described in greater detail below, has a plurality of masks thereon each of which, when aligned with the input end of the fiber optic bundle, will expose selected groups of fibers and block the remaining groups from illumination source D thereby creating the desired numeral pattern on viewing screen E.

As shown in FIG. 1, the display device of the present invention is illustrated as it could be used in conjunction with a television receiver with both VHF and UHF capability. The VHF tuner mechanism 10, which may comprise a variable condenser tuned transmission line or the like, is connected to a control knob 12 by means of a shaft 14. Knob 12 is mounted on the outside of the set housing (not shown) for easy accessibility. As knob 12 is rotated, shaft 14 is also rotated thereby corporally conditioning tuner mechanism 10 to select the frequency corresponding to the desired channel. Operably connected to knob 12 is a VHF channel indicator 16 which will rotate in accordance with the rotation of knob 12. The set housing (not shown) has a stationary mask or window (not shown) thereon which permits visibility only of a selected portion of indicator 16. Preferably, this selected viewing portion is in the twelve o'clock position with respect to indicator 16.

Indicator 16 has spaced along the surface thereof the numerals 2 through 13 each of which represents a different one of the VHF channels. A blank space is left between the numerals 2 and 13 for reasons which will become apparent. Indicator 16 is mounted on control knob 12 such that the numeral corresponding to the channel to which the receiver is tuned will appear in the viewing window. Preferably, each of the numerals on indicator 16 is formed from a plurality of dots such that when that numeral is observed it will appear to be the same as the numerals which are formed by the fiber optic display to be described. The numerals on indicator 16 are illuminated by a light 18 which is placed on the side of the indicator 16 thereby illuminating it in an edgewise fashion.

As long as the receiver is tuned to one of the twelve VHF stations, light 18 is energized and the viewer observes one of the numerals on indicator 16 through the viewing window. When the viewer wishes to watch a UHF station, he turns control knob 12 to a position such that the blank space between the numerals 2 and 13 on indicator 16 is aligned with the viewing window. When this happens, light 18 is automatically turned off and illumination source D energized.

Illumination source D preferably takes the form of a bulb 17 situated in a flat parabolic type reflector 19. Reflector 19 collimates the light from bulb 17 to provide the input end B with parallel rays of concentrated illumination.

The UHF channels are selected by means of rotating UHF channel selector knob 20. In the exemplary embodiment of the UHF tuner and control assembly here illustrated, the details of which form no part of the instant invention, knob 20 is operably connected to the UHF tuner mechanism 22 by means of a gearing system 24 known as a "geneva" gear. "Geneva" gear 24 is connected to knob 20 by means of shaft 26. "Geneva" gear 24 is connected to UHF tuner 22 by means of shaft 28.

Interposed betwen knob 20 and geneva gear 24 is masking means F. Masking means F comprises two discs 30 and 32 for controlling the units and tens indications respectively which are individually rotatable about a common axis and situated immediately adjacent each other. Each of the discs has a plurality of masks situated on the surface thereof. Each of the discs 30, 32 is sectioned into ten 36° sectors, i.e., 18° being active-used for masking-and the other half of the sector being passive-transparent. The transparent sectors are used as windows to transmit light to the adjacent disc. Each 18° masking subsector is broken into ten radial increments to correspond to each of the groups of fibers at the input end B of bundle A.

The tens digit disc 32 is connected to the gear 24 by means of shaft 34. The units digit mask 30 is mounted on shaft 36 which is coaxial with shaft 26 and fastened to selector knob 20.

Gear 24 functions to move tens disc 32 through an arc of 36°, each time units disc 30 rotates through an arc corresponding to ten channels, preferably a complete 360° rotation.

The input end B of fiber optic bundle A is arranged within a 36° sector of a circle and aligned with a 36° sector of masking means F. Preferably, fiber optic bundle A contains enough fibers to produce two separate numerals, a tens digit and a units digit, at display window E. The input end B of the fibers which will produce the units digit are aligned with one of the 18° mask subsectors of disc 30 and the input end B of the fibers which will produce tens digit is aligned with the 18° mask subsector of disc 32 immediately adjacent to it.

Masks 30 and 32 are rotatably offset by 18°. Hence, each 18° masking subsector of each disc 30, 32 will always be aligned with an 18° transparent subsector of the other mask. In this way, each mask is active on one half of the 36° sector of input end B. The light from illumination source D will pass through one of the 18° mask active subsectors in disc 30 and the immediately adjacent 18° mask active subsector in disc 32 simultaneously, thus causing both digits to appear in a side-by-side relationship at display window E.

Discs 30 and 32 are preferably made of standard photographic film which has been exposed to a master and then developed. However, discs of this type could be produced by hot stamping, silk screening, plating or metal punching, all of these processes producing the desired results.

The fibers which make up fiber optic bundle A are preferably 0.02 inch in diameter, having an optically clear core and a 0.0005 inch coating of a material having a lower refractive index than the core material. For these types of fibers, light loss is approximately 15 percent in lengths which are conveniently utilizable in this application. Further, the fiber bundle is reasonably flexible to permit positioning of the display location with respect to the control knobs.

The specific coding arrangement of the fibers used in fiber optic bundle A will next be described. For simplicity, the coding arrangement necessary to produce only a single digit at the display location will be described. However, it should be understood that in the application herein described, two digits are necessary and therefore two complete arrangements of fibers will be used in a side-by-side relationship to produce a two digit number. One of these arrangements will be aligned with an 18° masking subsector of the units disc 30 and the other being with an adjacent 18° masking subsector of the tens disc 32. Therefore, there will be an active masking region of 36°. However, in the following description the arrangement suitable for producing only one of the digits will be described, corresponding to an active masking region of only 18°.

In the first embodiment as shown in FIGS. 2 through 12, the fiber optic bundle is divided into ten groups of a total of 25 fibers. As shown in FIG. 2, which illustrates the arrangement of the input end of the fibers bundle, each of these groups is placed in a vertical column with the fibers within each of the groups being horizontally aligned. This vertical column will span an 18° sector of a circle and therefore corresponds to the mask aligned therewith. Each of the groups in the column is designated with a letter starting with the bottom of the column. As can be seen, groups $a$ and $b$ contain a single fiber, groups $c$ and $d$ contain two fibers each, groups $e, f, g, h$ and $i$ contain three fibers each, and group $j$ contains four fibers. Each of the fibers in a group is designated with a subscript starting from the left to the group as seen in the drawing. For example, the three fibers in group g would be designated $g_1, g_2,$ and $g_3$, respectively.

The output end C of the fiber bundle A is shown in FIG. 3. As can be seen herein, the output end of the fibers forms a figure 8 matrix. Each of the fibers is labeled at the output end to correspond with the labeling system of the input end. When all of the fibers are illuminated at the input end B, the output end C will appear as shown in FIG. 3 in the form of the numeral 8. When groups $a, b, c, f, g,$ and $j$ are masked, the numeral 1 will be visible, as shown in FIG. 4. When groups $c$ and $h$ are masked, the numeral 2 will be visible, as shown in FIG. 5. When groups $b, c,$ and $g$ are masked, the numeral 3 will appear, as shown in FIG. 6. When groups $e, g,$ and $j$ are masked, the numeral 4 will appear, as shown in FIG. 7. When groups $d$ and $g$ are masked, the numeral 5 will be visible, as shown in FIG. 8. When group $d$ is masked, the numeral 6 will be visible, as shown in FIG. 7. When groups $b, c, f, g$ and $j$ are masked, the numeral 7 will appear, as shown in FIG. 10. When group $g$ is masked, the numeral 9 will appear, as shown in FIG. 11 and when group $f$ is masked, the numeral 0 will appear, as shown in FIG. 12. Therefore, by masking none of the groups or masking selected groups, any numeral from 1 to 0 can be displayed at display window E.

The second preferred embodiment of the coding arrangement is shown in FIGS. 13 through 24. FIG. 13 shows the input end B of fiber bundle A. In this embodiment, the input end B has 30 fibers divided into 20 groups placed in two side-by-side vertical columns which combined take up an 18° sector of a circle. Each of the groups is lettered, starting from the bottom at the right-hand column, for ease of identification. Again, within each group the fibers are horizontally aligned. Groups $a, b, c, d, e, f, k, l, m, n, o$, and $p$ have one fiber each. Groups $g, h, i$ and $q, r, s$, contain two fibers each, and groups $j$ and $t$ have three fibers each.

Each of the fibers within each group (wherein the group has more than one fiber) is labeled by use of a subscript starting from the leftmost fiber. For example, group $s$ consists of fiber $S_1$ and fiber $S_2$.

The output end $C$ of the fiber bundle of the second preferred form is shown in FIG. 14. As can readily be seen, the fibers form a matrix comprising three rows intersecting three columns. Each fiber is represented by the letter, and subscripted when necessary, which corresponds to the labeling shown in FIG. 13. When all the groups except $f, s, i$ and $j$ are masked, the numeral 1 is produced, as shown in FIG. 15. When groups $b, c, d, i, j, l, m$ and $t$ are masked, the numeral 12 is visible, as shown in FIG. 16. When groups $b, c, d, i, j, l, m, o, p$, and $r$ are masked, the numeral 3 is visible, as shown in FIG. 17. When groups $g, i, j, o, q, n, r$ and $s$ are masked, the numeral 4 is visible, as shown in FIG. 18. When groups $h, i, j, l, o, p$ and $r$ are masked, the numeral 5 is visible, as shown in FIG. 19. When groups $a, i, j, l, h, m, o$ and $p$ are masked, the numeral 6 appears, as shown in FIG. 20. When groups $b, c, d, e, f, i, l, n, o, p, q, r$ and $t$ are masked, the numeral 7 appears, as shown in FIG 21. When groups $o, p, d, l, a, m, j$ and $i$ are masked, the numeral 8 appears, as shown in FIG. 22. When groups $o, p, r, d, a, m, j$ and $i$ are masked, the numeral 9 appears, as shown in FIG. 23 and when groups $o, p, e, f, k, j, i, a$, and $m$ are masked, the numeral 0 appears as shown in FIG. 24.

The coding arrangement of both embodiments have the advantage of producing numerals which are all of the same size. This contributes to proper registration between the tens and units digits displayed, as well as between the number and the display window. Also, due to the flexibility of the fibers, slanted numerals may be produced by both embodiments. Further, the numerals produced by the second coding arrangement may be rounded in form and have numerals 1 and 7 which are centered with respect to the other numerals and therefore present a more aesthetically pleasing display than the other coding arrangements.

The coding arrangements described herein provide an asthetically pleasing display of adequately sized numbers at a cost comparable to conventional display methods. The display device utilizing this arrangement takes up no more space than conventional display devices and eliminates problems associated with rigidity of the display location with respect to the control knobs. Further, digit registration can be accurately controlled and the display pattern evenly illuminated.

Two preferred embodiments of the present invention have been specifically disclosed herein for purposes of illustration. It is apparent that many modifications and variations may be made upon the specific structure disclosed herein. It is intended to cover all of these variations and modifications which fall within the scope of this invention as defined by the appended claims.

We claim:

1. A display device comprising a plurality of light transmitting fibers each having a light input end and a light output end, said light input ends being divided into a plurality of distinct groups of one or more fibers, at least one of said groups comprising a different number of fibers from another of said groups, said groups being arranged generally radially to form a relatively narrow sector of a circle, said light output ends being arranged in an indicia-producing matrix, means for illuminating said light input end of said fibers, means interposed between said input end of said fibers and said illuminating means having a plurality of masks thereon, each of said masks operative on a circle sector substantially the same shape as said input group sector, said mask means being movable to bring a selected one of said masks into position to block or expose said groups of fiber input ends in such a way as to form representations of different indicia at the output ends.

2. The device according to claim 1 wherein there are ten groups of fibers arranged substantially in line at said input end and in a figure 8 matrix at said output end.

3. The device according to claim 1 wherein said masking means comprises radially alternating active and passive sectors, said active sectors having opaque sections and said passive sectors being transparent.

4. The device of claim 1 wherein said groups are arranged in said sector with groups having lower numbers of fibers being located nearer the center of the circle in which said sector is formed than groups having a higher number of fibers.

5. A display device comprising a plurality of light transmitting fibers each having a light input end and a light output end, said light input ends being divided into a plurality of distinct groups $a$ through $j$, groups $a$ and $b$ comprising one fiber each, groups $c$ and $d$ comprising two fibers each, groups $e, f, g, h$, and $i$ comprising three fibers each and group $j$ comprising four fibers, said groups being lettered as seen from the input end starting from the group nearest the center of the circle in which said sector is formed, said groups being arranged generally radially to form a relatively narrow sector of a circle, said light output ends being arranged in an indicia-producing matrix, means for illuminating said light input end of said fibers, means interposed between said input end of said fibers and said illuminating means having a plurality of masks thereon, each of said masks operative on a circle sector substantially the same shape as said input group sector, said mask means being movable to bring a selected one of said masks into position to block or expose said groups of fiber input ends in such a way as to form representations of different indicia at the output ends.

6. The device according to claim 5 wherein said fibers are arranged as follows at the output end:

| a | $e_1$ | $e_2$ | $c_3$ | $i_3$ |
|---|---|---|---|---|
| $c_2$ | | | | $d_2$ |
| $c_1$ | | | | $d_1$ |
| b | $f_1$ | $f_2$ | $f_3$ | $i_2$ |
| $g_3$ | | | | $h_3$ |
| $g_2$ | | | | $h_2$ |
| $g_1$ | | | | $h_1$ |
| $j_1$ | $j_2$ | $j_3$ | $j_4$ | $i_1$ |

7. A display device comprising a plurality of light transmitting fibers each having a light input end and a light output end, said light input ends being divided into twenty groups of fibers, said groups being arranged in two generally parallel columns arranged generally radially to form a relatively narrow sector of a circle at said input end, said light output end being arranged in an indicia producing matrix, said matrix comprising fibers being arranged in three rows intersecting three columns, means for illuminating said input end of said fibers, means interposed between said input end of said fibers and said illuminating means having a plurality of masks thereon, each of said masks operative on a circle sector substantially the same shape as said input group sector, said mask means being movable to bring a selected one of said masks into position to block or expose said groups of fiber input ends in such a way as to form representations of different indicia at the output ends.

8. The device according to claim 7 wherein said fiber groups comprise groups a through t, groups a, b, c, d, e and f in said first column and said groups k, l, m, n, o and p in said second column comprising one fiber each, groups g, h, i in said first column and groups q, r and s in said second column comprising two fibers each and groups j in said first column and t in said second column comprising three fibers each, said groups being lettered as seen from the input end starting from the bottom of the right-hand column.

9. The device according to claim 8 wherein said fibers are arranged as follows at the output end:

| a | $q_1$ | $s_2$ | $q_2$ | m |
|---|---|---|---|---|
| b |  | $i_2$ |  | $h_2$ |
| c |  | $i_1$ |  | $h_1$ |
| d | e | f | k | l |
| $r_2$ |  | $j_3$ |  | $t_3$ |
| $r_1$ |  | $j_2$ |  | $t_2$ |
| n |  | $j_1$ |  | $t_1$ |

| o | $g_1$ | $s_1$ | $g_2$ | p |

10. A display device comprising a plurality of light transmitting fibers each having a light input end and a light output end, said light input ends being divided into a plurality of distinct groups of one or more fibers, said groups being arranged generally radially in a relatively narrow sector of a circle, said light output ends being arranged in an indicia producing matrix, means for illuminating said light input end of said fibers, means interposed between said input end of said fibers and said illuminating means having a plurality of masks thereon, said masking means comprising a tens disc and a units disc, each of said masks operative on a circle sector substantially the same shape as said input group sector, said mask means being movable to bring a selected one of said masks into position to block or expose said groups of fiber input ends in such a way as to form representations of different indicia at the output ends.

11. The device according to claim 10 wherein said tens disc and said units disc are coaxially aligned.

12. The device according to claim 10 wherein said tens disc and said units disc are each divided into a plurality of sectors each of said sectors being divided into an active subsector and a passive subsector.

13. The device according to claim 12 wherein said units disc and said tens disc are rotatably offset such that an active subsector of one is aligned with a passive subsector of the other.

* * * * *